(12) United States Patent
Kim (10) Patent No.: US 12,454,303 B2
(45) Date of Patent: Oct. 28, 2025

(54) STEERING CONTROL DEVICE AND METHOD

(71) Applicant: HL MANDO CORPORATION, Pyeongtaek-si (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 802 days.

(21) Appl. No.: 17/689,961

(22) Filed: Mar. 8, 2022

(65) Prior Publication Data
US 2022/0289267 A1     Sep. 15, 2022

(30) Foreign Application Priority Data

Mar. 11, 2021 (KR) .................. 10-2021-0031778

(51) Int. Cl.
| | |
|---|---|
| B62D 1/22 | (2006.01) |
| B60R 25/02 | (2013.01) |
| B62D 15/02 | (2006.01) |
| G01D 5/14 | (2006.01) |

(52) U.S. Cl.
CPC ............ B62D 1/22 (2013.01); B60R 25/02 (2013.01); B62D 15/022 (2013.01); G01D 5/145 (2013.01); *B60Y 2304/01* (2013.01); *B60Y 2400/3012* (2013.01)

(58) Field of Classification Search
CPC ............ B60R 25/02; B60Y 2304/01; B60Y 2400/3012; B62D 1/22; B62D 15/022; G01D 5/145
See application file for complete search history.

(56) References Cited

U.S. PATENT DOCUMENTS

| | | | |
|---|---|---|---|
| 11,597,407 B2 * | 3/2023 | Kim .................... | B60W 10/10 |
| 2002/0171627 A1 | 11/2002 | Noguchi et al. | |
| 2014/0214275 A1 | 7/2014 | Miller et al. | |
| 2017/0267285 A1 | 9/2017 | Abbas et al. | |

FOREIGN PATENT DOCUMENTS

| | | |
|---|---|---|
| CN | 101722987 | 6/2010 |
| CN | 102826116 | 12/2012 |
| CN | 107215391 | 9/2017 |
| CN | 107976142 | 5/2018 |

(Continued)

OTHER PUBLICATIONS

Okuno, JP 2006-290077, machine translation. (Year: 2006).*

(Continued)

*Primary Examiner* — Mark L. Greene
(74) *Attorney, Agent, or Firm* — WOMBLE BOND DICKINSON (US) LLP (57) ABSTRACT

The disclosure relates to a steering control device and method. According to the disclosure, a steering control device comprises a detachable dial including a permanent magnet, a hall sensor detecting a position of a magnet provided in the dial, and a controller receiving manager authentication information, calculating a rotation angle of the dial based on a position of the permanent magnet received from the hall sensor when the manager authentication information is valid, and transmitting a control signal to a road wheel actuator (RWA) to move a tire to a position corresponding to the rotation angle.

17 Claims, 8 Drawing Sheets

(56) References Cited

FOREIGN PATENT DOCUMENTS

| | | | | |
|---|---|---|---|---|
| CN | 208915258 | 5/2019 | | |
| CN | 110550085 | 12/2019 | | |
| CN | 110588759 | 12/2019 | | |
| CN | 210047533 | 2/2020 | | |
| CN | 110861701 | 3/2020 | | |
| CN | 110884561 | 3/2020 | | |
| CN | 111341172 | 6/2020 | | |
| CN | 111516747 | 8/2020 | | |
| DE | 203 00 016 | 3/2003 | | |
| DE | 10 2005 022 008 | 6/2006 | | |
| DE | 10 2017 105 772 | 9/2017 | | |
| DE | 10 2017 217 639 | 4/2019 | | |
| JP | 11-118517 | 4/1999 | | |
| JP | 2002-343193 | 11/2002 | | |
| JP | 2006-290077 | 10/2006 | | |
| KR | 10-2002- 0058823 | 7/2002 | | |
| KR | 20210084722 A | * | 7/2021 | ........ B60W 60/0051 |

OTHER PUBLICATIONS

Muller, DE 10 2017 217 639, machine translation. (Year: 2019).*
Ma, CN 110588759, machine translation. (Year: 2019).*
Kim, KR 20210084722, machine translation. (Year: 2021).*
Office Action dated Feb. 12, 2024 for German Patent Application No. 102022202469.9 and its English machine translation by Google Translate.
Office Action dated Dec. 15, 2023 for Chinese Patent Application No. 202210242364.5 and its English translation from Global Dossier.
Wei Bo et al.; "Road-Feeling Simulation Application Based on Steer-by-Wire"; Mechanical Engineering & Automation, No. Aug. 4, 2018.
Office Action dated Jul. 22, 2025 for German Patent Application No. 10 2022 202 469.9 and its English translation by Google Translate.
Notice of Allowance dated Sep. 12, 2025 for Korean Patent Application No. 10-2021-0031778 and its English translation from Global Dossier.

* cited by examiner

FIG.8

STEERING CONTROL DEVICE AND METHOD

CROSS-REFERENCE TO RELATED APPLICATION

This application claims priority from Korean Patent Application No. 10-2021-0031778, filed on Mar. 11, 2021, which is hereby incorporated by reference for all purposes as if fully set forth herein.

BACKGROUND

Field

The disclosure relates to a steering control device and method and, more specifically, to a steering control device and method for controlling the steering of a vehicle when no self-driving function is provided.

Description of Related Art

In general, a vehicle adopts a power steering assist device as means to ensure steering stability by reducing the steering force of the steering wheel. Conventionally, hydraulic power steering (HPS) has been widely used as power steering assist devices but are recently being replaced with electric power steering (EPS) which facilitates steering using a motor, instead of a hydraulic pump, and is eco-friendly.

Meanwhile, to reduce weight in vehicles, steer-by-wire (SBW) systems have been developed which electrically connect the steering shaft (or column), including the steering wheel and the reaction force motor, with the actuator, including the wheels and rack bar, and transmit the driver's steering force.

As self-driving evolves, the driver's steering may be no longer required. If so, the steering wheel may be unnecessary. However, the steering wheel is still needed to respond to a certain situation where the driver's own control is required.

Therefore, a need exists for a method for normally putting the space for the steering wheel in service and, in a certain situation, allowing for the driver's own driving.

BRIEF SUMMARY

In the foregoing background, there is provided a steering control device and method for controlling the steering of a vehicle by controlling a detachable dial.

To achieve the foregoing objectives, according to an aspect of the disclosure, there is provided a steering control device comprising a detachable dial including a permanent magnet, a hall sensor detecting a position of a magnet provided in the dial, and a controller receiving manager authentication information, calculating a rotation angle of the dial based on a position of the permanent magnet received from the hall sensor when the manager authentication information is valid, and transmitting a control signal to a road wheel actuator (RWA) to move a tire to a position corresponding to the rotation angle.

According to another aspect of the disclosure, there is provided a steering control method, comprising a manager authentication information validity determination step of receiving manager authentication information and determining validity of the manager authentication information, a rotation angle calculation step of calculating a rotation angle of a dial based on a position of a permanent magnet received from a hall sensor when the manager authentication information is valid, and a tire control step of transmitting a control signal to a road wheel actuator (RWA) to move a tire to a position corresponding to the rotation angle.

According to the disclosure, the steering control device and method may remove the steering wheel in level 4 or higher self-driving to put the internal space of the host vehicle into use and, in an emergency, enable the host vehicle to be controlled via the detachable dial. It is also possible to replace the steering wheel and steering angle sensor by calculating the rotation angle of the dial through the hall sensor.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control device according to an embodiment of the disclosure is described with reference to the accompanying drawings.

Figure 1:
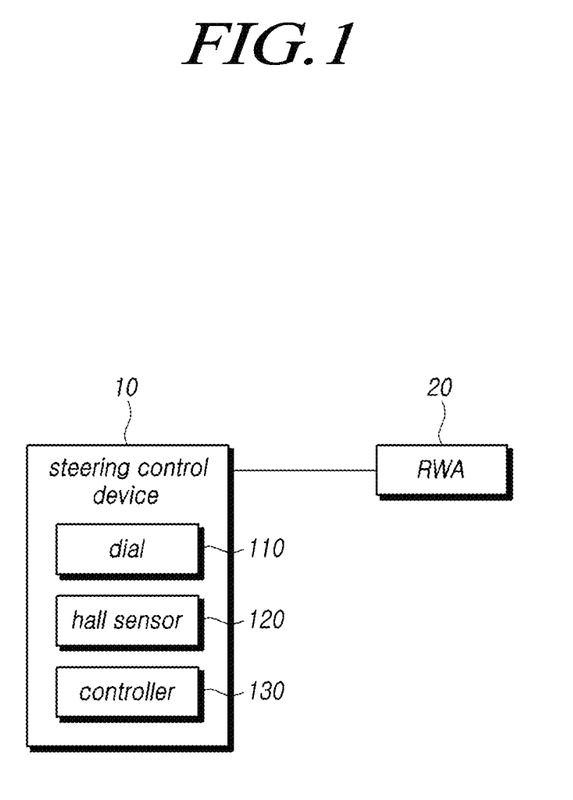
FIG. 1 is a block diagram illustrating a steering control device and a road wheel actuator (RWA) according to an embodiment of the disclosure.

FIG. 1 is a block diagram illustrating a steering control device 10 and a road wheel actuator (RWA) 20 according to an embodiment of the disclosure.

Referring to FIG. 1, according to an embodiment of the disclosure, a steering control device 10 may receive manager authentication information, determine the validity of the authentication information and, if the authentication information is valid, calculate the rotation angle of a dial 110 based on the position of a permanent magnet 111, and transmit a control signal to an RWA 20 to move the tire to a position corresponding to the rotation angle.

The steering control device 10 may be connected to the RWA 20 via a wire and transmit/receive information. Accordingly, the steering control device 10 may transmit a control signal to the RWA 20 to move the rack included in the RWA 20 to a target rack position, and the RWA 20 may transmit the position of the tire or the position of the rack corresponding thereto to the steering control device 10 through a rack position sensor or a tire position sensor. The transmission/reception of information through the wire is merely an example and embodiments of the disclosure are not limited thereto.

The RWA 20 may move based on a position value (target rack position, tire position, etc.) corresponding to the steering angle of the dial 110.

Specifically, the RWA may mean a device to drive a vehicle to actually steer. The RWA 20 may include a pinion shaft motor, a rack, tires, a vehicle speed sensor, a rack force sensor, and a rack position sensor.

The RWA 20 may further include a motor torque sensor capable of detecting the motor torque of the pinion shaft motor.

The pinion shaft motor may axially move the rack. Specifically, the pinion shaft motor may be driven by receiving a control signal from the steering control device 10 and linearly move the rack in the axial direction.

The rack may be linearly moved by the driving of the pinion shaft motor, and the tires may be steered left or right through the linear motion of the rack.

In a typical steer-by-wire (SbW) system, as the steering angle of the steering wheel is changed by the driver, the sensor included in the steering wheel feedback actuator (SFA) on the column side may detect the displacement of the steering angle, calculate the rack position corresponding thereto, and transmit a control signal to the RWA 20 to move the rack to the target rack position. The RWA 20 may receive the control signal and move the rack to the rack position corresponding to the control signal, and the position of the tire may also be changed corresponding to the position of the rack. The RWA 20 may transmit feedback signals, such as the position of the tire, position of the rack, or error correction, to the SFA through the rack position sensor and the tire position sensor included in the RWA 20. The SFA, receiving the feedback signal, may implement the steering effort as a reaction force through a reaction force motor.

However, as the self-driving technology evolves, implementable self-driving levels increase and, for self-driving levels 0 to 3, the components of the electronic power steering (EPS) or SbW having the above-described mechanical link are required. However, for self-driving level 4 or higher, in most circumstances, the host vehicle self-drives, so that control by the steering wheel and control according to feedback signals disappear. Accordingly, it is possible to omit the reaction force motor of the SFA configuration and the controller 130 for controlling the SFA, as well as the steering wheel. In other words, the above-described mechanical link is not necessary.

Thus, the disclosure allows a detachable dial 110 to function as the steering wheel and determines the validity of manager authentication information in a certain situation to allow the driver to control the steering of the host vehicle.

Figure 2:
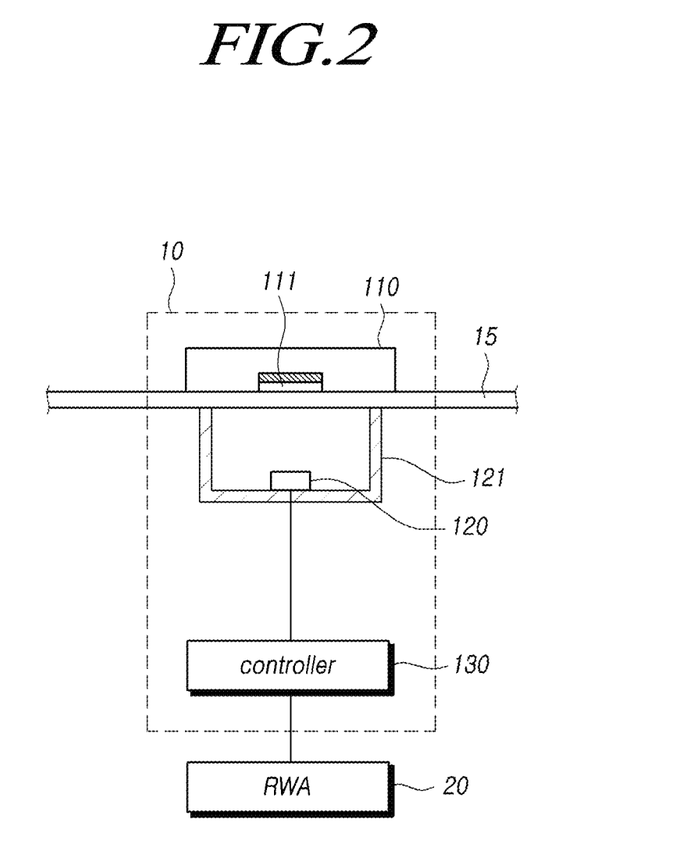
FIG. 2 is a view schematically illustrating a structure of a steering control device according to an embodiment of the disclosure.

FIG. 2 is a block diagram illustrating a steering control device 10 according to an embodiment of the disclosure.

Referring back to FIG. 1, according to an embodiment of the disclosure, the steering control device 10 may include a dial 110, a hall sensor 120, and a controller 130.

Figure 3:
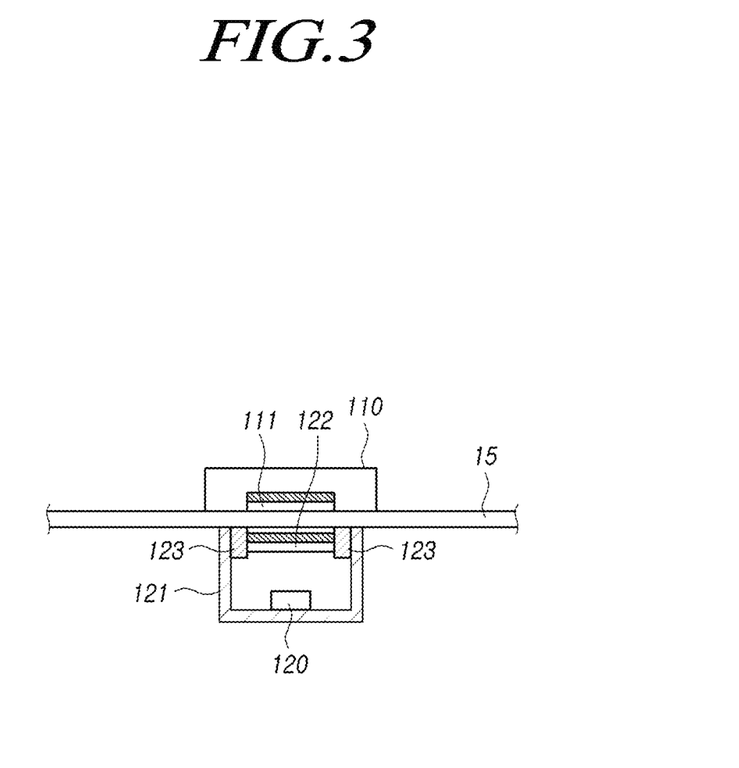
FIG. 3 is a view illustrating detecting a position of a permanent magnet through a reference magnet according to an embodiment.

FIG. 3 is a view schematically illustrating a structure of a steering control device 10 according to an embodiment of the disclosure.

The configuration of the above-described steering control device 10 is described with reference to FIG. 3. The dial 110 may be shaped as a cylinder or an ellipse, and may include a permanent magnet 111. The dial 110 may be detachably attached to the dashboard 15 of the host vehicle. If a layer of, e.g., tempered glass is formed on the dashboard 15, the dial 110 may be detachably attached to the tempered glass layer. The dashboard 15 may be a partition to divide the engine room and the driver's seat. The dial 110 is not limited to a specific shape, such as a cylinder or ellipse, but may rather be formed in any shape that allows the permanent magnet 111 included in the dial 110 to be rotated through manipulation of the dial 110.

Referring back to FIG. 1, the hall sensor 120 is a sensor that figures out the direction and magnitude of a magnetic field using the hall effect that a voltage is generated in a direction perpendicular to a magnetic field and current when the magnetic field is applied to a conductor through which the current flows and may be a sensor that makes use of the effect of creation of a current difference.

The hall sensor 120 may detect the position of the permanent magnet 111 provided in the dial 110 using such characteristics. In other words, if the dial 110 rotates, the permanent magnet 111 included in the dial 110 is rotated, and the hall sensor 120 may detect the position of the rotated permanent magnet 111.

Referring to FIG. 2, the hall sensor 120 may be disposed on a lower surface of the dashboard 15 and be included and positioned inside the housing 121. The housing 121 may be formed of a material for blocking surrounding magnetic fields. Further, for more accurate detection, the hall sensor 120 may be disposed on the lower surface of the housing 121, a predetermined distance apart from the dashboard 15.

Figure 4:
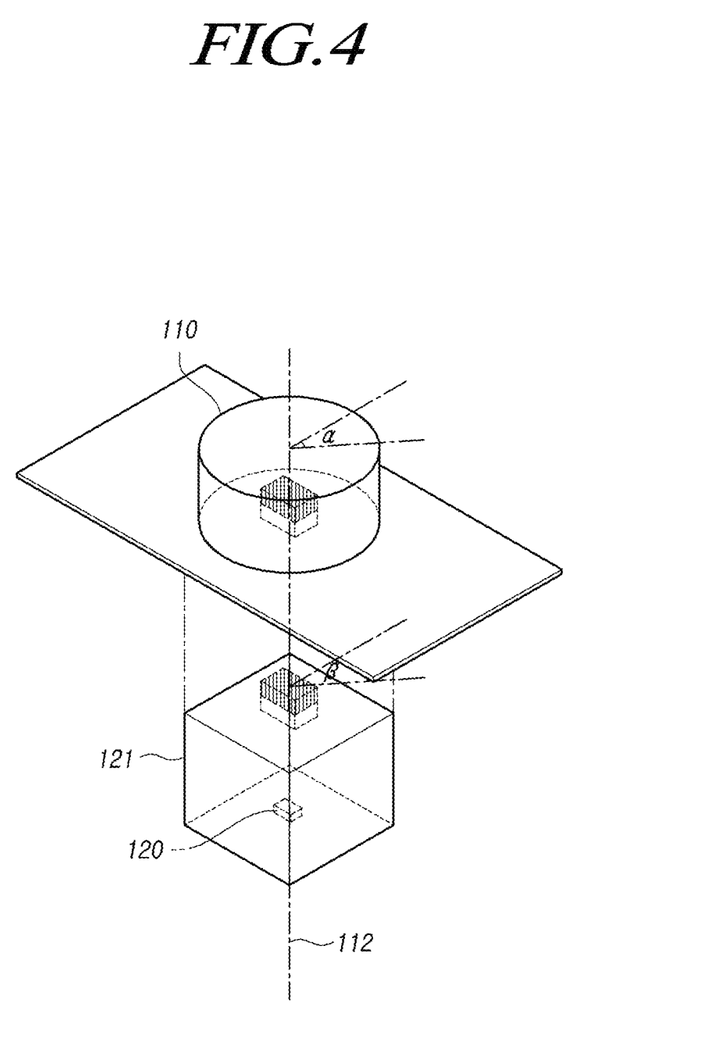
FIG. 4 is a view illustrating rotation of a reference magnet corresponding to rotation of a permanent magnet according to an embodiment.

FIG. 3 is a view illustrating detection of the position of the permanent magnet 111 through a reference magnet 122 according to an embodiment. FIG. 4 is a view illustrating rotation of the reference magnet 122 corresponding to rotation of the permanent magnet 111 according to an embodiment.

Referring to FIG. 3, the hall sensor 120 may detect the position of the permanent magnet 111 based on the position of the reference magnet 122 located between the hall sensor 120 and the permanent magnet 111 of the dial 110.

The hall sensor 120 is positioned inside the housing 121 to detect the position of the permanent magnet 111 but, since the permanent magnet 111 is positioned on the upper surface of the dashboard 15, it may be influenced by the driver or an object present on the driver's seat. In other words, although the dial 110 is not rotated, a variation in magnetic field may be generated, causing the hall sensor 120 to detect the permanent magnet 111 as rotated.

Accordingly, the hall sensor 120 may more accurately detect the position of the permanent magnet 111 through the reference magnet 122 which is rotated corresponding to the permanent magnet 111. To that end, the reference magnet 122 may be rotated around a rotation shaft 112 of the dial 110 by a bearing 123 installed inside the housing 121 and the housing 121 including the reference magnet 122. The reference magnet 122 may be formed of the same permanent magnet as the permanent magnet 111.

Specifically, referring to FIG. 4, the reference magnet 122 may be disposed on a lower end of the dashboard 15 and may be rotated by the bearing 123 corresponding to the rotation of the permanent magnet 111. The reference magnet 122 may be included in the housing 121, and the bearing 123 may be installed inside the housing 121. The reference magnet 122 and the permanent magnet 111 are shaped as rectangular parallelepipeds but, without limited thereto, they may rather be formed in any shape in which, as the permanent magnet 111 is rotated, the reference magnet 122 may be rotated, and the position of the permanent magnet 111 may be detected by the hall sensor 120.

To detect the position of the permanent magnet 111, the permanent magnet 111, the reference magnet 122, and the hall sensor 120 may be arranged on the line of the rotation shaft 112 of the dial 110. In other words, if the dial 110 is rotated, the reference magnet 122 may be rotated by the bearing 123 corresponding to the permanent magnet 111 inside, and the permanent magnet 111 and the reference magnet 122 may be rotated around the same rotation shaft 112.

The reference magnet 122 may be rotated at the same rotation angle corresponding to the rotation of the permanent magnet 111 and may be rotated according to a predetermined reference. In other words, in FIG. 4, the rotation angle of the permanent magnet 111 and the rotation angle of the reference magnet 122 may be different values.

Referring back to FIG. 1, the controller 130 may receive manager authentication information and, if the manager authentication information is valid, calculate the rotation angle of the dial 110 based on the position of the permanent magnet 111 received from the hall sensor 120, and transmit a control signal to the RWA 20 to allow the tire to move a position corresponding to the rotation angle.

The manager authentication information may be a form of a password which is a combination of numbers, characters, and symbols, the user's fingerprint, the user's face shape, or a pattern including a specific path. The manager authentication information may be generated by inputting a password or inputting a preset user fingerprint, a preset user face shape, and pattern. The manager authentication information may be generated by inputting a separately prepared steering control button.

To generate the manager authentication information, the steering control device 10 may further include an input unit that receives manager authentication information and transmits it to the controller 130. The input unit may include, e.g., a fingerprint sensor or touchscreen for receiving, e.g., a fingerprint, or a camera for detecting the user's face.

According to an embodiment, steering control of the host vehicle may be provided by an interface provided by the input unit, instead of the dial 110. The input unit may be configured as a touchscreen, and steering control of the host vehicle may be performed by touching the touchscreen.

The controller 130 may further include an output unit 140 that receives tire information changed corresponding to the rotation angle of the dial 110 from the RWA 20 and outputs the position of the tire based on the tire information.

Specifically, the controller 130 may calculate the rotation angle of the dial 110 based on the difference between the positions, before and after the change, of the permanent magnet 111 detected by the hall sensor 120. According to an embodiment, the controller 130 may set a specific position of the permanent magnet 111 as an offset of the rotation angle of the dial 110 and calculate the position of the permanent magnet 111, changed with respect to the offset of the rotation angle, as the rotation angle of the dial 110.

The controller 130 may set an offset of the dial 110 based on the magnetic field detected from the reference magnet 122 and the permanent magnet 111 disposed in the line of the rotation shaft of the dial 110. As described above, the controller 130 may set a specific position of the reference magnet 122 as an offset of the rotation angle of the dial 110, calculate the position of the reference magnet 122, changed with respect to the offset of the rotation angle, as the rotation angle of the dial 110, and calculate the rotation angle of the dial 110 based on the difference between the positions, before and after the change, of the reference magnet 122.

The controller 130 may transmit a control signal to the RWA 20 to move the tire to the position corresponding to the rotation angle of the dial 110, based on the rotation angle of the dial 110 calculated as described above. The control signal may include target rack position information. As the rack moves to the target rack position, the position of the tire interworking therewith may also move to the position corresponding to the rotation angle of the dial 110.

Figure 5:
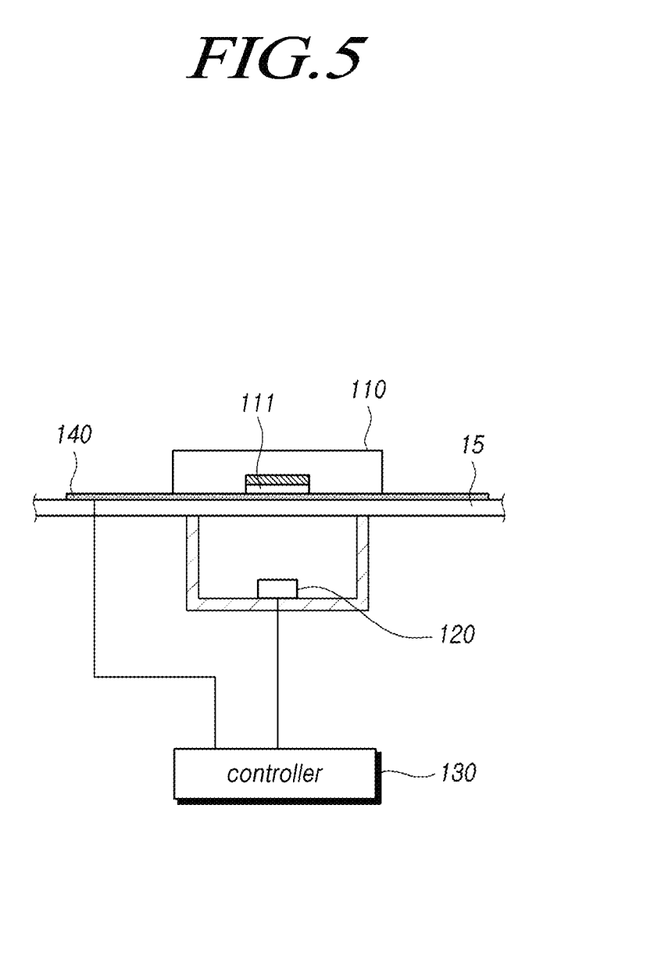
FIGS. 5 and 6 are views illustrating an output unit for outputting a position of a tire according to an embodiment.
Figure 6:
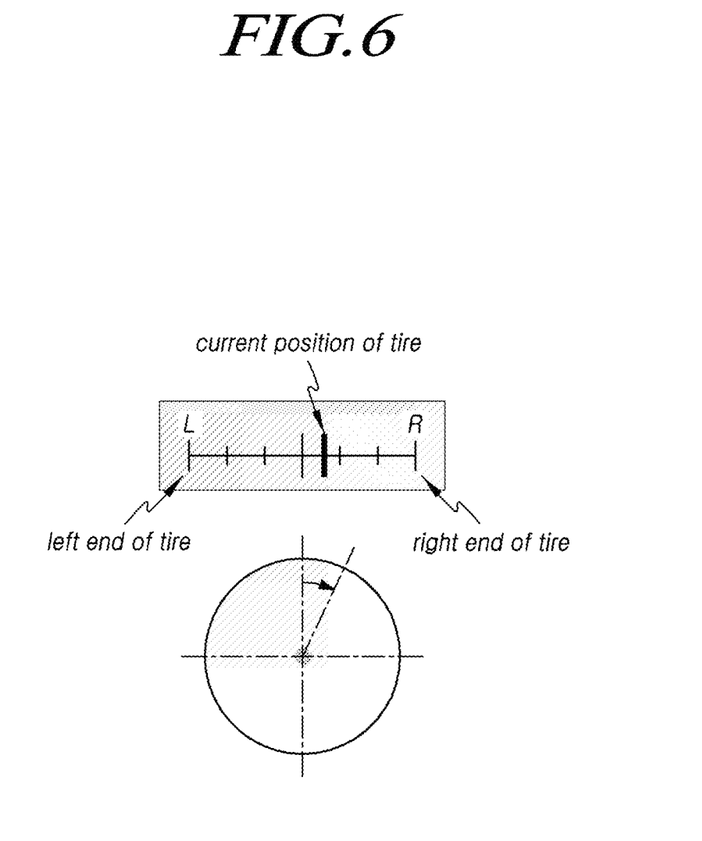

FIGS. 5 and 6 are views illustrating an output unit 140 for outputting a position of a tire according to an embodiment.

Referring to FIG. 5, the controller 130 may receive information about the tire changed corresponding to the rotation angle of the dial 110, from the RWA 20. The steering control device 10 may further include an output unit 140 that outputs the position of the tire based on tire information.

Specifically, as a control signal is received so that the rack is moved to the target rack position, the position of the tire interworking with the rack is moved to the position corresponding to the rotation angle of the dial 110, and the RWA 20 may transmit the changed tire information through the tire position sensor included in the RWA 20 to the controller 130. The output unit 140 may output the position of the tire based on the tire information received from the controller 130.

The output unit 140 may be disposed on an upper surface of the dashboard 15 and, according to an embodiment, it may be disposed between the dial 110 and the dashboard 15 as shown in FIG. 5. The output unit 140 may include a display module and output the tire information through the display module. The output unit 140 may output the tire information to the dashboard 15 through a head-up display (HUD) module.

Referring to FIG. 6, the output unit 140 may output the current position of the tire and the current rotation angle of the dial 110. The output unit 140 may output both the left end and right end of the tire, allowing the driver to determine the degree of steering of the host vehicle. The output unit 140 may allow a sense of manipulation of the dial 110 controlled by the driver to be determined by simultaneously outputting the current position of the tire and the current steering angle of the dial 110.

The controller 130 may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 7:
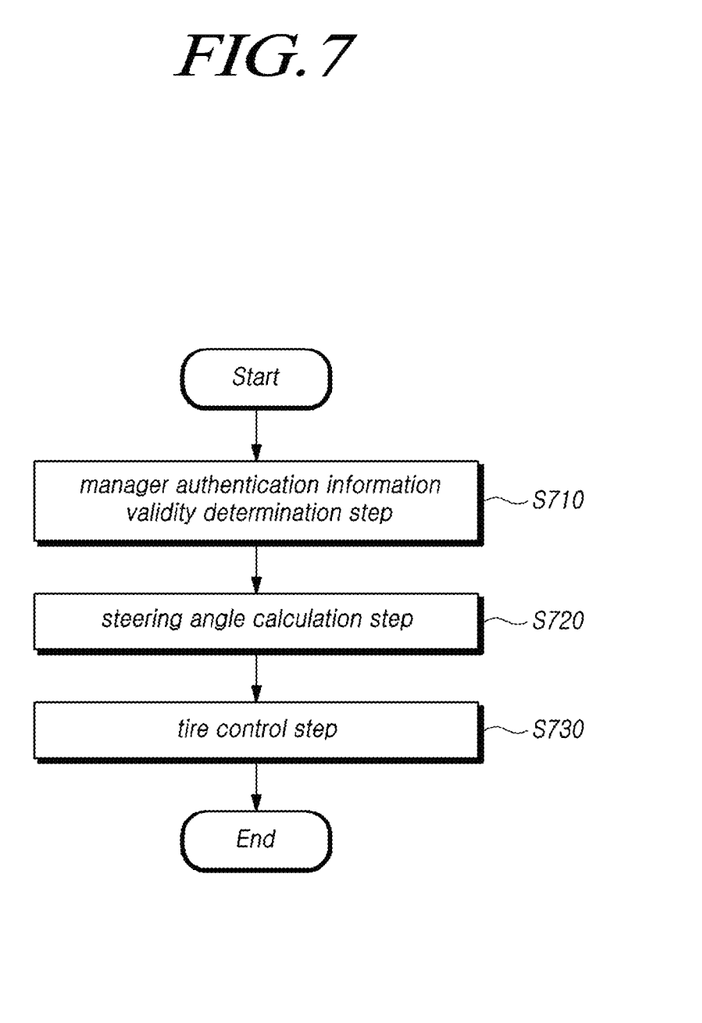
FIG. 7 is a flowchart illustrating a steering control method according to an embodiment of the disclosure.
Figure 8:
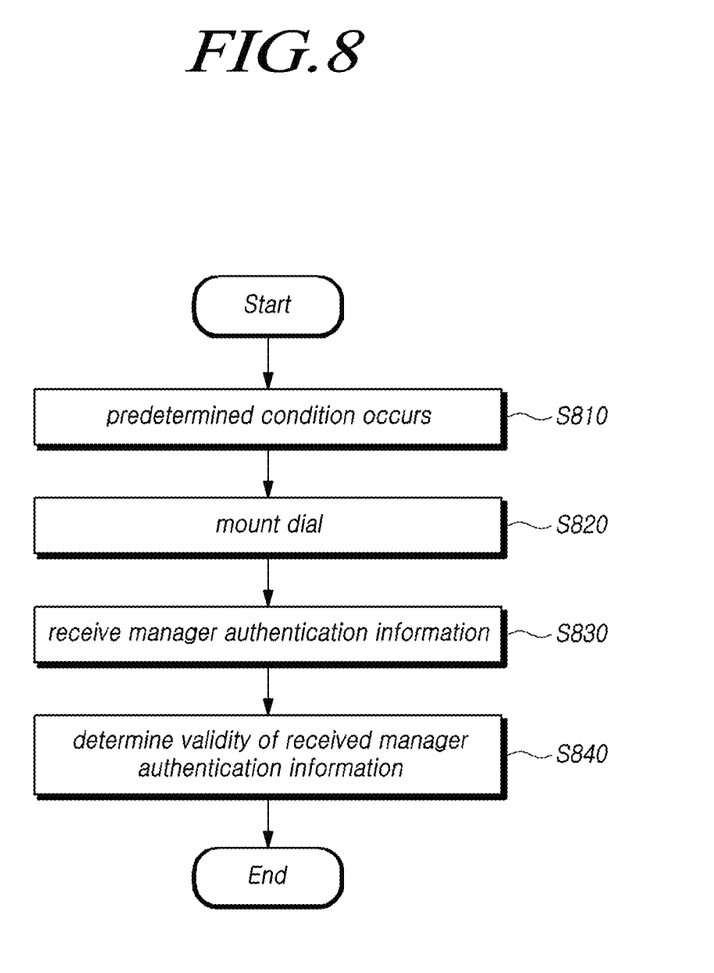
FIG. 8 is a flowchart illustrating, in greater detail, step S710 according to an embodiment.

FIG. 7 is a flowchart illustrating a steering control method according to an embodiment of the disclosure.

Referring to FIG. 7, according to the disclosure, a steering control method may include a manager authentication information validity determination step S710 of receiving manager authentication information and determining validity of the manager authentication information, a rotation angle calculation step S720 of calculating a rotation angle of the dial 110 based on a position of a permanent magnet 111 received from a hall sensor 120 when the manager authentication information is valid, and a tire control step S730 of transmitting a control signal to a road wheel actuator (RWA) 20 to move a tire to a position corresponding to the rotation angle.

The rotation angle calculation step S720 may set an offset of the dial 110 based on a magnetic field detected from the reference magnet 122 and the permanent magnet 111 disposed in the line of the rotation shaft of the dial 110 for steering.

The manager authentication information validity determination step S710 may permit access by a manager according to a predetermined condition and, if the dial 110 is mounted, determine the validity of the received manager authentication information.

The steering control method may further include a manager authentication information input step of receiving the manager authentication information.

The steering control method may further include a tire information reception step of receiving tire information changed corresponding to the rotation angle of the dial 110 from the RWA 20 and a tire information output step of outputting the position of the tire based on the tire information.

FIG. 9 is a flowchart illustrating, in greater detail, step S710 according to an embodiment.

Referring to FIG. 9, the steering control device 10 may permit reception of manager authentication information according to a predetermined condition (S810). Specifically, the predetermined condition may mean at least one of when the host vehicle is incapable of self-driving, when the host vehicle departs from a pre-stored terrain, or when the driver's steering control request signal is received.

The steering control device 10 may determine whether the host vehicle performs self-driving by detecting a failure in, e.g., a sensor (e.g., an image sensor, a vehicle speed sensor, or a GPS sensor), radar, or lidar mounted to the host vehicle. Whether the host vehicle departs from the pre-stored terrain may be determined by a GPS sensor mounted to the host vehicle, and whether the steering control request signal is received may be determined by receiving it through the input unit included in the steering control device 10.

The manager may be the driver or a passenger in the host vehicle.

The steering control device 10 may determine whether the dial 110 is mounted (S820). The steering control device 10 may determine whether the dial 110 is mounted on an upper surface of the output unit 140 or the dashboard 15 as reception of manager authentication information is permitted. To that end, the steering control device 10 may further include a sensor for detecting a mounting of the dial 110. According to an embodiment, the dial 110 may be mounted on the upper surface of the output unit 140 or the dashboard 15 and may be configured to be unlocked according to a preset condition.

The steering control device 10 may receive manager authentication information (S830). The manager authentication information may be generated through at least one of inputting a password, inputting a pattern, or inputting a steering control button included in the dial 110.

The steering control device 10 may determine the validity of the received manager authentication information (S940). The steering control device 10 may determine whether the received password input or pattern input matches a preset password or pattern.

The above-described step S820 of determining whether the dial 110 is mounted may be performed before or after step S830 or S840 as long as reception of manager authentication information is permitted according to the predetermined condition.

As described above, according to the disclosure, the steering control device and method may remove the steering wheel in level 4 or higher self-driving to put the internal space of the host vehicle into use and, in an emergency, enable the host vehicle to be controlled via the detachable dial. It is also possible to replace the steering wheel and steering angle sensor by calculating the rotation angle of the dial through the hall sensor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device, comprising:
a detachable dial including a permanent magnet;
a hall sensor detecting a position of the permanent magnet included in the dial; and
a controller receiving manager authentication information, determining whether the manager authentication information is valid, calculating a rotation angle of the dial based on a position of the permanent magnet received from the hall sensor when the manager authentication information is valid, and transmitting a control signal to a road wheel actuator (RWA) to move a tire to a position corresponding to the rotation angle.

2. The steering control device of claim 1, wherein the controller sets an offset of the dial based on a magnetic field generated by the permanent magnet and a reference magnet disposed in a line of a rotation shaft of the dial.

3. The steering control device of claim 2, wherein the reference magnet is disposed between the hall sensor and the permanent magnet.

4. The steering control device of claim 2, wherein the reference magnet is rotated around the rotation shaft of the dial by a housing including the reference magnet and a bearing installed in the housing.

5. The steering control device of claim 1, further comprising an input unit receiving the manager authentication information and transmitting the manager authentication information to the controller,
wherein the input unit is disposed on an upper surface of a dashboard.

6. The steering control device of claim 1, wherein the manager authentication information is generated through at least one of an input of a password, an input of a pattern, or an input of a steering control button included in the dial.

7. The steering control device of claim 1, wherein the controller further includes an output unit that receives tire information changed corresponding to the rotation angle of the dial from the RWA and outputs a position of the tire based on the tire information.

8. The steering control device of claim 1, wherein the controller permits reception of the manager authentication information according to a predetermined condition and, if the dial is mounted, determines the validity of the received manager authentication information.

9. The steering control device of claim 8, wherein the predetermined condition includes at least one of when a host vehicle is incapable of self-driving, when the host vehicle departs from a pre-stored terrain, or when a driver's steering control request signal is received.

10. A steering control method, comprising:
by a hall sensor, detecting a position of a permanent magnet included in a detachable dial;
receiving manager authentication information and determining validity of the manager authentication information;
calculating a rotation angle of the detachable dial including the permanent magnet based on a position of the permanent magnet received from the hall sensor when the manager authentication information is valid; and
transmitting a control signal to a road wheel actuator (RWA) to move a tire to a position corresponding to the rotation angle.

11. The steering control method of claim 10, wherein the calculating of the rotation angle of the detachable dial comprises setting an offset of the dial based on a magnetic field generated by the permanent magnet and a reference magnet disposed in a line of a rotation shaft of the dial for steering.

12. The steering control method of claim 11, wherein the reference magnet is disposed between the hall sensor and the permanent magnet.

13. The steering control method of claim 11, wherein the reference magnet is rotated around the rotation shaft of the dial by a housing including the reference magnet and a bearing installed in the housing.

14. The steering control method of claim 10, wherein the manager authentication information is generated through at least one of an input of a password, an input of a pattern, or an input of a steering control button included in the dial.

15. The steering control method of claim 10, further comprising:
receiving tire information changed corresponding to the rotation angle of the dial from the RWA; and
outputting a position of the tire based on the tire information.

16. The steering control method of claim 10, wherein the determining of the validity of the manager authentication information comprises permitting reception of the manager authentication information according to a predetermined condition and, if the dial is mounted, determining the validity of the received manager authentication information.

17. The steering control method of claim 16, wherein the predetermined condition includes at least one of when a host vehicle is incapable of self-driving, when the host vehicle departs from a pre-stored terrain, or when a driver's steering control request signal is received.

* * * * *